E. KRETCHMER.
Bee Hive.
No. 59,614. Patented Nov. 13, 1866.
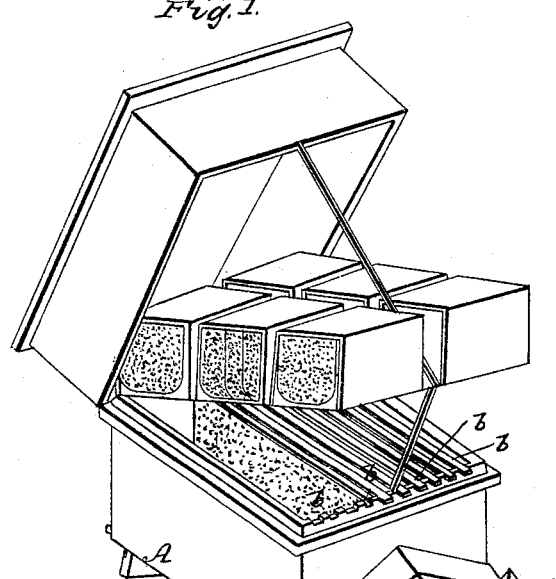
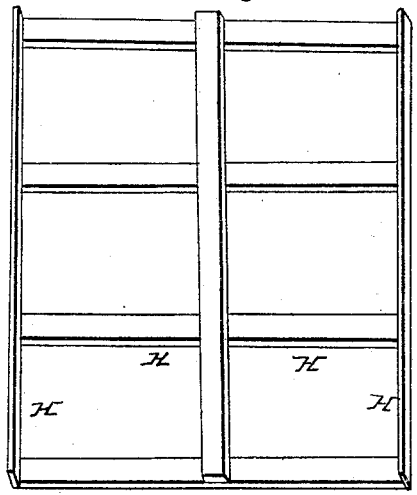
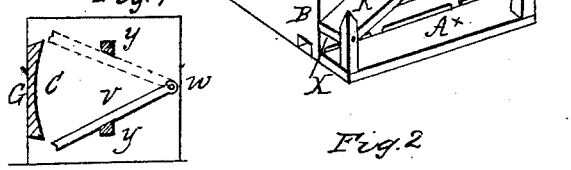
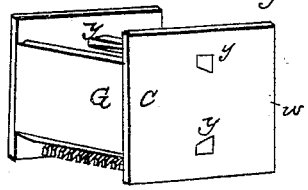
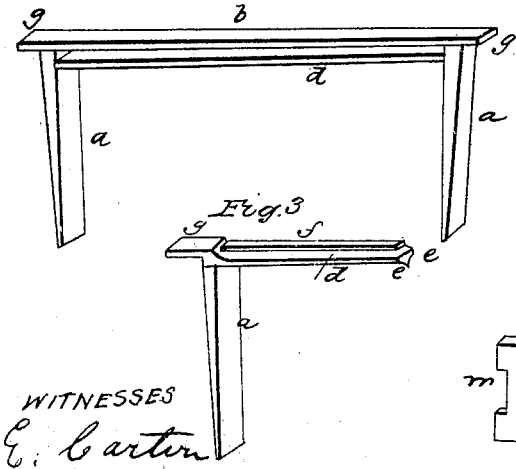
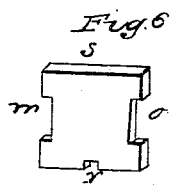
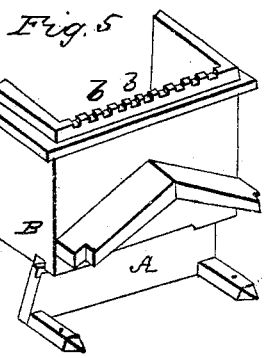
WITNESSES
E. Carter
John Zion
INVENTOR
Edward Kretchmer

UNITED STATES PATENT OFFICE.

EDWARD KRETCHMER, OF PLEASANT GROVE, IOWA.

IMPROVEMENT IN BEE-HIVES.

Specification forming part of Letters Patent No. 59,614, dated November 13, 1866.

*To all whom it may concern:*

Be it known that I, EDWARD KRETCHMER, of Pleasant Grove, in the county of Des Moines, in the State of Iowa, have invented several new Improvements in Bee-Hives; and I do hereby declare that the following is a full and exact description thereof, reference being had to the accompanying drawings and to the letters marked thereon.

The nature of my invention consists, first, in constructing the entrance-protector in such a manner that it may be reversed for the purpose of changing the size of the entrance; second, in constructing the bottom of bee-hives in such a manner that it will form a moth-trap to entrap the moth and admit the miller to deposit her eggs into said trap; third, in providing the front of bee-hives with a sectional adjustable sliding swarming-guard and entrance-regulator, to prevent swarming and robbing, excluding of drones, and enlarging and diminishing the size of the entrance.

To enable others skilled in the art to make and use my invention, I will now proceed to describe its construction and operation.

I generally construct the sides of hives in single form; but where the hive is to be exposed to the extremes of heat or cold, I construct it double sided by putting another hive, in an inverted position, over and around a single-sided hive, in such a manner that there will be a dead-air space between the two hives. The width of the outside hive is equal to the length of the inside hive, so that the hereinafter-described comb-holders will also fit the outside hive. The interior of these single and double sided hives, I provide with movable comb-holders, of which Figure 2 is a perspective view, and Fig. 3 a cross-section thereof. These I arrange side by side, resting in the gage cut in the upper edge of the end pieces of the case or body of the hive, as seen at $b$, Figs. 1 and 5. These comb-holders consist of two vertical pieces, $a$, Figs. 2 and 3, being beveled on the outside for easy adjustment. A comb-bar, $d$, Figs. 2 and 3, provided with a narrow three-cornered tongue or lath of wood. After this tongue or lath is attached to the comb-bar $d$, I apply a finishing-plane, and with it the lower corner is slightly rounded off, and the corners next to the comb-bar beveled and slightly rounded, so as to make the base (nearest the comb-bar) narrower than the middle, for the purpose of giving bees a more thorough hold while clustered for comb-building. As a slanting comb-guide does not afford a good hold, I make it narrower at the base and round the corners to reduce the size. The corners of the comb-bar next to said tongue are also rounded off, $e\ e$, Fig. 3. This comb-bar $d$, fastened to the vertical pieces $a$, Figs. 2 and 3, may complete these comb-holders; but they may be fastened to the dividing-bar $f$, Fig. 2, or said dividing-bar may be used separate from the comb-holders, lying loose upon them, as seen at Fig. 3.

I construct the comb-bar of the comb-holders in the above-described manner, as bees very frequently, by the use of a flat, even, or cornered comb-bar, commence the building of their combs on the corners of said bar; but if said corners are rounded off, as seen at $e\ e$, Fig. 3, and provided with a tongue in the middle thereof, constructed as described, bees will commence and continue the building of their combs invariably on the above-named tongue, causing the building of straight combs, kept from the sides or ends of the body of the hive by the vertical pieces $a\ a$. The comb-holders, open at the bottom, permit the bees to build their combs to the full extent of the hive.

The moth-trap in my hives I make by separating a piece from each end of the bottom board of the hive, as seen at A, Figs. 1 and 5. A groove is cut in the inner edge of said separated pieces of the bottom board throughout their length. The upper inner corner or part next to said groove is shortened a little, the grooved pieces, when fastened to the bottom board with hinges or their substitutes, forming a part of the bottom of the hive; and the projecting part of the front moth-trap, held in place by the pin $k$, Fig. 1, serving as a lighting-board, $A^\times$, Fig. 1. The rear moth-trap, represented as dropped open at A, Fig. 1, is held shut by a piece of twine wound round a nail.

The chamber formed by the groove cut in the pieces described, will serve as a hiding-place for the cowardly moth. The hole B, Figs. 1 and 5, cut at the ends of said chamber, will admit the moth-miller into it, where she will deposit her eggs in the excrement and pieces of wax generally collected there. To remove the moth the trap may be opened by removing the pin K, Fig. 1, and thus dropping the trap, as seen at A, Fig. 5; or the moth may be removed by pushing a piece of lath through the hole B, Figs. 1 and 5. I also provide my bee-hives with a swarming-guard and entrance-regulator, formed by four or any desired number of square sections. Fig. 6 is a representation of one of these sections. These sections are arranged side by side in a sliding channel, in which they may be moved over the main entrance or kept on each or either side thereof, as seen at X, Fig. 1. If these sections are kept over the entrance cut in the body of the hive, the side o down, will only permit worker bees to pass, confining the queen, and therefore preventing swarming. If the side m is down, passage is given to queen and workers, confining or excluding the drones. The side r down, will only admit one bee at a time, and by it robbing is prevented to some extent. The side s down, will shut up the hive, or the entrance may be enlarged or diminished by moving the sections accordingly.

In connection with the above-named entrance-regulator, I use a reversible entrance-protector, C, of which Fig. 8 is a perspective view, and Fig. 7 a longitudinal section thereof. I generally construct it of wood; but any other material may be used. The two side pieces are square, held together by the front piece, G, and the two supports y y. Between the sides and supports I arrange, side by side, a number of bars, V, Fig. 7, held in proper place by a piece of wire put through a small hole made in one end of said bars, and on which they may swing freely, as seen at w, Fig. 7. This wire is fastened in the sides, at w, Fig. 8. The top, bottom, and rear are open. This device, when adjusted to the entrance of the hive, the front piece, G, facing it, will admit all bees, as they will slightly raise the swinging bars V in the act of entering. These bars fall down on the supports as soon the bee has passed, and consequently prevent their return, as the bars cannot be raised from the inside. If the device is inverted, the swinging bars will take a position as indicated by the two dotted lines, Fig. 7, giving an entrance nine-sixty-fourths of an inch, admitting all bees, loaded or unloaded. The loaded bees will slightly raise the bars, but allowing only those not filled with honey to return. If robber-bees should enter the hive, they are thus compelled to return without honey or remain in the hive, making robbing impossible, by merely reversing the entrance-protector.

I disclaim all old devices described in the foregoing specification, such as movable frames or comb-holders, for such were first invented by Francis Huber, of Genoa, in the year 1795, and described in Taylor's Bee-Keeper's Manual, published in London, England, in 1838; nor do I claim the construction of a three-cornered or V-shaped comb-guide; but

I claim as new and my invention—

1. The reversible entrance-protector C, provided with swinging bars V, supports y y, and front G, all arranged and operating substantially as and for the purpose set forth.

2. Constructing and operating the moth-trap substantially in the manner and for the purpose as set forth.

3. Constructing and operating the sectional adjustable sliding swarming-guard and entrance-regulator substantially in the manner and for the purpose as above set forth.

EDWARD KRETCHMER.

Witnesses:
E. CARTER,
JOHN ZION.